(No Model.) 2 Sheets—Sheet 1.
H. L. DIXON.
MACHINE FOR MOLDING TUYERES.
No. 268,642. Patented Dec. 5, 1882.
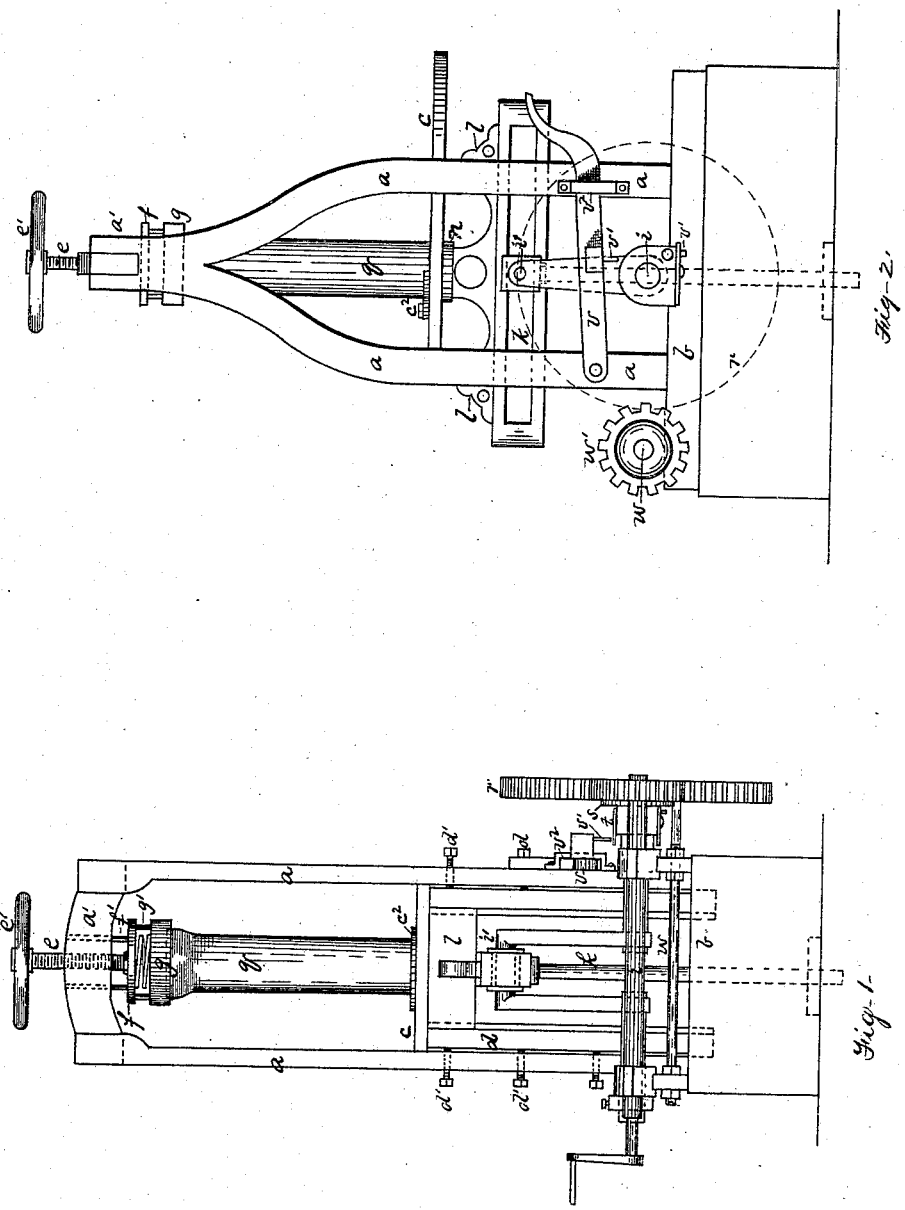
Witnesses
W. B. Conwin
L. C. Fitler
Inventor
Henry L. Dixon (No Model.) 2 Sheets—Sheet 2.
H. L. DIXON.
MACHINE FOR MOLDING TUYERES.
No. 268,642. Patented Dec. 5, 1882.
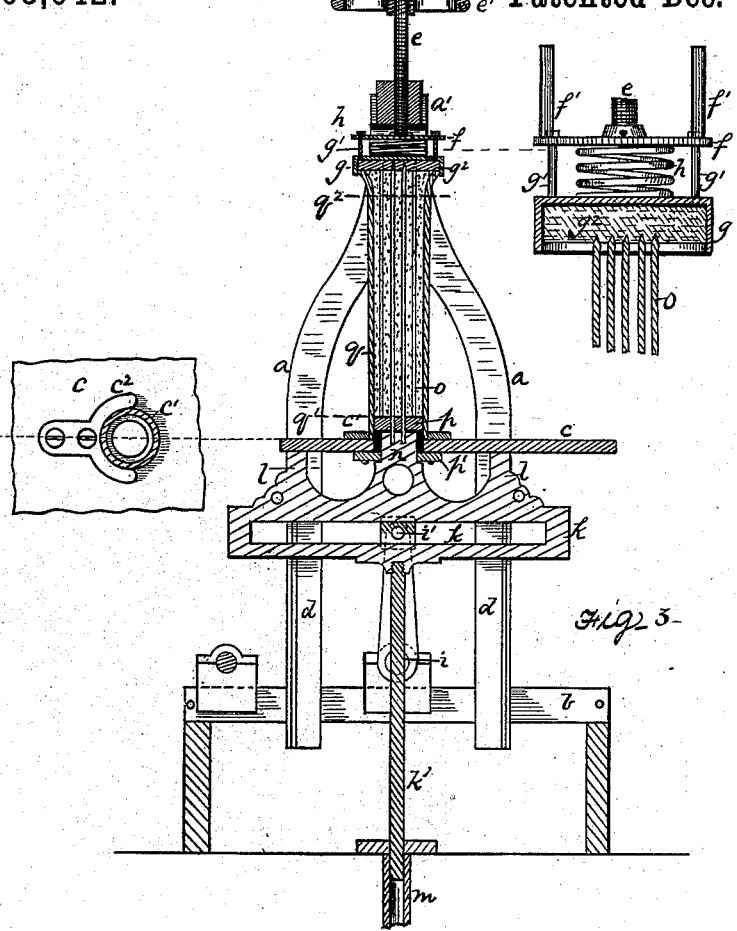
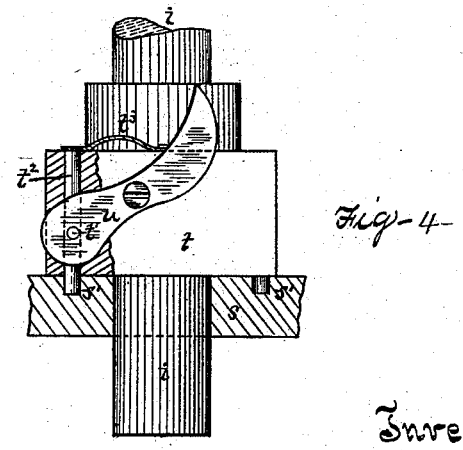
Fig. 3.
Fig. 4.
Witnesses.
Inventor.
Henry L. Dixon

UNITED STATES PATENT OFFICE.

HENRY L. DIXON, OF PITTSBURG, PENNSYLVANIA.

MACHINE FOR MOLDING TUYERES.

SPECIFICATION forming part of Letters Patent No. 268,642, dated December 5, 1882.

Application filed September 29, 1882. (No model.)

*To all whom it may concern:*

Be it known that I, HENRY L. DIXON, of Pittsburg, in the county of Allegheny and State of Pennsylvania, have invented a new and useful Improvement in Machines for Molding Tuyeres; and I do hereby declare the following to be a full, clear, and exact description thereof.

My improvement relates to the construction of machines for molding tuyeres for Bessemer converters and similar purposes; and it consists of a power-operated machine in which the tuyere is molded, perforated, and compressed at one operation and by the movement of one plunger.

To enable others skilled in the art to make and use my invention, I will now describe it by reference to the accompanying drawings, in which—

Figure 1 is an end elevation of the machine. Fig. 2 is a side elevation. Fig. 3 is a vertical section. Fig. 4 is a detail view.

Like letters of reference indicate like parts in each.

The frame $a$ of the machine is mounted upon a suitable bed, $b$, and it consists of four posts or standards joined at the top by a cross-head, $a'$. At a suitable height on the standards $a$ is a table, $c$, for sustaining the mold, which table is provided with a hole, $c'$, for the passage of the perforating-rods and plunger from below. On the inner sides of the standards $a$, below the table $c$, are ways $d$, the edges of which are preferably of a V shape. In a suitable nut placed in the cross-head $a'$ is a screw, $e$, provided with a hand-wheel, $e'$. Fastened to the lower end of the screw $e$ is a plate, $f$, having guide-rods $f'$, which extend up in suitable holes in the cross-head $a'$, so as to guide the plate in its vertical movement to and from the upper end of the mold.

Adjustably secured to the plate $f$, by means of smooth sliding stems $g'$, is a recessed mold-head, $g$, the inner diameter of which is of sufficient size to permit it to fit over the upper end of the tuyere-mold. In the head $g$ is a facing, $g^2$, of cork or other elastic or resilient material, which is designed to prevent the ends of the perforating-rods from being dulled or turned by contact with the solid portion of the head when forced up through the clay in the mold, the said facing acting as a buffer not only for the purpose stated, but also to prevent the said rods from coming against the rigid part of the head, and in case the latter should not yield thereto causing the breakage of the same. For the more certain prevention of such breakage I have interposed between the plate $f$ and the head $g$ a spring, $h$, which is of sufficient stiffness to hold the head $g$ firmly down on the mold for all ordinary purposes of the compression and perforation of the tuyere, but will yield to the pressure of rigid parts—such as the tuyere-rods—when forced up by the plunger from below.

Mounted on the bed $b$ is a crank-shaft, $i$, the wrist $i'$ of which works in a yoke, $k$, which is secured to slides $l$, placed between and traveling on the ways $d$. Extending down from the lower side of the yoke $k$ is a guide-rod, $k'$, which runs down into and reciprocates in a tube, $m$, placed in the floor under the machine. The object of this construction is to guide the yoke and its slides, and hold them steady in their vertical movement in the ways $d$.

Secured to the upper surface of the yoke $k$ is a head, $n$, upon which is fastened the tuyere-perforating rods $o$. The rods $o$, which are of any desired number, extend vertically through the head $n$, and have pointed perforating ends. Mounted upon them is a perforated disk, $p$, which, when the head $n$ is at the lower end of its vertical movement, rests upon a suitable flange or stop, $p'$, fastened to the under side of the table $c$ around the edges of the hole $c'$. The functions of the disk $p$ are to keep the rods $o$, which are elastic, at proper relative distances apart when they enter the clay in the mold, and also to enter the lower end of the mold when forced up by the plunger-head $n$, and to compress the smaller end of the tuyere around the rods, so as to produce that compactness which is necessary in the end of the tuyere which is exposed to the heat of the converter.

Around the rear side of the hole $c'$, on the surface of the table $c$, is a centering flange or semicircle, $c^2$.

The tuyere-mold $q$ is of true cylindrical form from its lower end up to the line $q'$, the diameter of that portion being of sufficient size to admit the entrance and close movement therein of the disk $p$ when forced up by the plunger-head $n$. From the line $q'$ up to the point $q^2$ the mold $q$ is slightly tapering, the diameter at the point $q^2$ being in the ordinary size of mold about one-fourth of an inch larger. From the point $q^2$ to the upper end of the mold it flares considerably.

On one end of the shaft $i$ is a large gear-wheel, $r$, to the inner face of which is attached a disk, $s$. On the inner side of the disk $s$ are one or more holes, $s'$. The gear-wheel $r$ is loose on the shaft $i$, and fastened to the shaft inside of the disk is a block, $t$. On the side of the block $t$ is a pawl, $u$, the rear end of which projects inward beyond the inner face of the block and into the path of a pin, $v'$, projecting downward from a lever, $v$. The other end of the pawl $u$ is perforated to receive the pin $t'$ of a laterally-sliding stem or catch, $t^2$, which is placed in a hole in the block $t$ opposite that portion of the disk $s$ in which the holes $s'$ are made, and is held out so as to enter one of the holes $s'$ by a spring, $t^3$, fastened on the inner side of the block $t$. The lever $v$ is pivoted to one of the posts $a$ of the frame, and is guided in its movement by a strap, $v^2$, bolted to the other post $a$ on the same side of the machine. At the rear end of the machine is a power-shaft, $w$, which is provided with a pinion, $w'$, which meshes into the gear-wheel $r$.

The operation of my machine is as follows: The perforating-rods being down, a mold, $q$, filled with clay, is placed upon the table $c$, over the hole $c'$, and secured there by screwing down the head $g$. While this is being done the lever $v$ is down and its pin $v'$ is holding the stem $t^2$ back out of the hole $s'$, so that the gear-wheel $r$ is moving loosely on the shaft $i$. After the mold has been properly secured in position the lever $v$ is raised and the stem $t^2$ is permitted to spring into one of the holes $s'$, when the latter in the rotation of the disk $s$ comes around opposite to it. The shaft $i$ then revolves, forcing the head $n$ and perforating-rods $o$ upward, and the rods, passing through the disk $p$, are kept at proper distances apart, and enter and perforate the clay in the mold. When the head $n$ encounters the disk $p$ it forces it upward into the lower or cylindrical end of the mold $q$, and compresses the clay at that point firmly around the tuyere-rods, and compacts and solidifies that part of the tuyere. The further rotation of the shaft $i$ causes the crank to pass its center and to descend, drawing down with it the yoke $k$ and the head $n$, and thereby withdrawing the perforating-rods from the mold and carrying their upper ends down below the level of the table $c$. The disk $p$ descends until it comes in contact with the flange $p'$, where it rests. At this moment the lever $v$ is thrown down and its pin $v'$ comes in contact with the tail end of the pawl $u$ and causes the pawl to turn upon its pivot and withdraw the stem $t^2$ from the hole $s'$, and thereby release the shaft $i$ and permit it to remain stationary. The head $n$ is then raised and the mold removed, another mold filled with clay placed on the machine, and the operation just described repeated.

The ways $d$ are secured to the post $a$ by means of adjustable screw-bolts, so that they may be adjusted in and out to take up wear or slack in the machine and preserve the smoothness of motion of the slides $l$.

Instead of using a flange upon the lower edge of the hole $c'$, I can make use of lugs or projections, or any other form of stop suitable for the purpose. I can also make use of any other suitable form of clutch device for connecting the gear-wheel $r$ with the shaft $i$—such, for instance, as a sliding clutch mounted on the shaft and operated by a suitable lever.

The advantage of my construction consists in the fact that I am enabled at one operation of the machine to mold, perforate, and compress the fire end of the tuyere. The machine is strong and simple in construction, and is not liable to get out of order. The parts are all accessible, and repairs can be easily made. It is rapid in its operation, and yields a largely-increased product over any machine heretofore known to me, with less labor.

The taper in the mold $q$ is provided to enable the tuyere to be easily discharged therefrom. If desired, however, a longitudinally-partible mold may be used.

I do not limit myself to the use of a mold having a cylindrical section, because the same may be omitted. It is desirable, as it in a large degree obviates the exudation of the clay around the compressing disk or head, and makes a better finish.

If desired, the compressing-disk may be dispensed with and the plunger or head enter the mold and compress the clay; but I prefer it, as it makes a smooth and better tuyere, and it gives a means of guiding and spacing the tuyere-rods.

It is apparent that the power-wheel $r$ can be mounted on a separate shaft and revolve close enough to the end of the shaft $i$ to enable the clutch device on the latter to be thrown into and out of connection therewith; also, that the holes or recesses $s'$ may be made in the face of the wheel, if solid, instead of in a disk, $s$; also, that the sliding part of the clutch may be formed upon or in connection with the power-wheel.

When the spring $h$ is used the elastic facing $g^2$ may be omitted. If desired, a perforated plate may be substituted for the facing $g^2$.

All these are changes which will be apparent to the skilled mechanic, but which do not affect the operation or purpose of my invention.

The ways $d$ are mounted upon the standards $a$ by means of adjusting-screws $d'$, so as to be adjusted to preserve the true vertical movement of the slides $l$, and to take up any slack or looseness arising from wear or shrinkage.

What I claim as my invention, and desire to secure by Letters Patent, is—

1. In machines for molding tuyeres, the combination of a mold with a compressing head or plunger, which enters the mold and compresses the clay therein, provided with perforating-rods, which perforate the clay, substantially as and for the purposes described.

2. In machines for molding tuyeres, the combination of a mold, a plunger or head carrying the perforating-rods, and a compressing-disk carried by the head up into the mold, substantially as and for the purposes described.

3. In machines for molding tuyeres, the combination of a mold, a plunger or head carrying the perforating-rods, and a perforated disk sustained at or near the end of the mold, for guiding and spacing the rods as they enter the clay, substantially as and for the purposes described.

4. In machines for molding tuyeres, the combination of a mold, a plunger or head carrying perforating-rods, and a head tightly closing the end of the mold, having elastic facing, substantially as and for the purposes described.

5. In machines for molding tuyeres, the combination of a mold, a plunger or head provided with perforating-rods, and a head closing the end of the mold and held in position by a spring, substantially as and for the purposes described.

6. The combination of the reciprocating sliding head with adjustable ways, substantially as and for the purposes described.

7. The combination, in a machine for molding tuyeres, of a reciprocating head having perforating-rods, a shaft for operating such head, a power-wheel, and a clutch capable of connecting and disconnecting the shaft with the power-wheel, substantially as and for the purposes described.

8. The combination of a shaft, a power-wheel having recesses on its side, a stem or catch on said shaft held out into the recesses in the power-wheel by a spring, a pawl connected to the stem and having its tail projecting in the path of a trip device, and a tripping device operated by a lever or handle for tripping the pawl, so as to withdraw the stem and disconnect the shaft from the power-wheel at will, substantially as and for the purposes described.

In testimony whereof I have hereunto set my hand this 23d day of September, A. D. 1882.

HENRY L. DIXON.

Witnesses:
W. B. CORWIN,
T. B. KERR.